(12) United States Patent
Lee

(10) Patent No.: US 12,374,906 B2
(45) Date of Patent: Jul. 29, 2025

(54) ELECTRONIC WRENCH AND WIRELESS CONNECTION AND CHARGE MODULE THEREOF

(71) Applicant: Sunheng Technology Co., Ltd., Taichung (TW)

(72) Inventor: Barry Lee, Taichung (TW)

(73) Assignee: SUNHENG TECHNOLOGY CO., LTD., Taichung (TW)

( * ) Notice: Subject to any disclaimer, the term of this patent is extended or adjusted under 35 U.S.C. 154(b) by 664 days.

(21) Appl. No.: 17/850,265

(22) Filed: Jun. 27, 2022

(65) Prior Publication Data

US 2023/0246462 A1  Aug. 3, 2023

(30) Foreign Application Priority Data

Jan. 28, 2022  (TW) .................................. 111104183

(51) Int. Cl.
  *H01M 10/46* (2006.01)
  *B25B 23/147* (2006.01)
  *H02J 7/00* (2006.01)

(52) U.S. Cl.
  CPC .......... *H02J 7/0044* (2013.01); *B25B 23/147* (2013.01); *H02J 7/0045* (2013.01)

(58) Field of Classification Search
  CPC ...... H02J 7/0044; H02J 7/0042; H02J 7/0045; H02J 50/10; H02J 50/005; B25B 23/147; B25B 23/1425; B25B 23/1422
  USPC .... 320/107, 108, 114, 115; 81/52, 467, 468, 81/479
  See application file for complete search history.

(56) References Cited

U.S. PATENT DOCUMENTS

| | | | | |
|---|---|---|---|---|
| 6,948,380 | B1* | 9/2005 | Shiao | B25B 13/461 |
| | | | | 73/862.21 |
| 8,171,828 | B2* | 5/2012 | Duvan | B25B 23/1425 |
| | | | | 73/862.27 |
| 8,925,430 | B2* | 1/2015 | Huang | B25B 23/1425 |
| | | | | 81/468 |
| 9,358,672 | B2* | 6/2016 | Gauthier | B25H 3/006 |
| 2006/0048584 | A1* | 3/2006 | Cupif | B25B 23/1425 |
| | | | | 73/862.23 |

(Continued)

FOREIGN PATENT DOCUMENTS

| | | | | |
|---|---|---|---|---|
| CN | 209190641 U | * | 8/2019 | ......... B25B 23/1422 |
| TW | M567166 | | 9/2018 | |

OTHER PUBLICATIONS

Machine translate TWM567166U (Sep. 21, 2018) (Year: 2018).*

*Primary Examiner* — Edward Tso
(74) *Attorney, Agent, or Firm* — MUNCY, GEISSLER, OLDS & LOWE, P.C.

(57) ABSTRACT

The present invention provides an electronic wrench and wireless connection and charge module thereof. The wireless connection and charge module is detachably combined to the electronic wrench and electrically connected with the sense control device of the electronic wrench. The wireless connection and charge module is modularized and provided with power charging and wireless signal transmission functions. When the mechanical structure of the electronic wrench is damaged and unusable, the wireless connection and charge module is allowed to be detached from the original electronic wrench to be re-installed on another electronic wrench for future usage.

10 Claims, 7 Drawing Sheets

(56) References Cited

U.S. PATENT DOCUMENTS

| | | | |
|---|---|---|---|
| 2013/0199344 A1* | 8/2013 | Lee | B25B 23/1425 81/467 |
| 2014/0165798 A1* | 6/2014 | Hsieh | B25B 23/1425 81/479 |
| 2014/0260837 A1* | 9/2014 | Gauthier | B25B 23/1425 81/479 |
| 2020/0400525 A1* | 12/2020 | King | B25B 13/463 |

* cited by examiner

ELECTRONIC WRENCH AND WIRELESS CONNECTION AND CHARGE MODULE THEREOF

1. FIELD OF THE INVENTION

The present invention relates to electronic wrenches, and more particularly, to an electronic wrench and wireless connection and charge module thereof.

2. DESCRIPTION OF THE RELATED ART

Referring to Taiwan Patent M567166, a torque wrench set up by smartphone is disclosed, which comprises a sensing device and a power part. The sensing device comprises at least a wireless signal transceiver module, which transmits the torque value signal of the wrench to the smartphone for processing. Also, the power part comprises a battery case for power supply of the sensing device.

However, the development and design of the sensing device of the aforementioned torque wrench are limited to the wireless signal transceiver module and therefore unable to be modularized, thus unfavorable for lowering the cost. When the mechanical structure of the torque wrench is damaged, due to the non-modularized design, even if the wireless signal transceiver module is not damaged, the whole wrench has to be discarded, causing an unnecessary waste. Also, the battery case is not rechargeable, failing to meet the environmental friendliness and convenience of usage.

SUMMARY OF THE INVENTION

To improve the issues above, the present invention discloses an electronic wrench and wireless connection and charge module thereof. Therein, the wireless connection and charge module is modularized, detachably combined to the electronic wrench, and electrically connected with the sensing control device of the electronic wrench. When the mechanical structure of the electronic wrench is damaged and unusable, the wireless connection and charge module is allowed to be detached from the original electronic wrench to be re-installed on another electronic wrench for future usage.

For achieving the aforementioned objectives, an embodiment of the present invention provides a wireless connection and charge module which is detachably combined to an electronic wrench, the wireless connection and charge module comprises a shell body, a carry board, a wireless connection unit, a charge unit, and a rechargeable battery. The shell body comprises a first end and a second end. The first end is plugged inserted in one end of the electronic wrench. The second end comprises an insertion groove along the axial direction. The first end comprises a module electronic connection portion which is electrically connected with the electronic wrench. The carry board is inserted in the insertion groove and electrically connected with the module electronic connection portion. The wireless connection unit and the charge unit are disposed on the carry board. The rechargeable battery is disposed in the shell body and electrically connected with the module electronic connection portion and the carry board.

For achieving the aforementioned objectives, another embodiment of the present invention provides an electronic wrench, comprising a tube body, a sense control device, and a wireless connection and charge module. The tube body comprises a drive portion on one end and a cavity on the other end, with a wrench electronic connection portion disposed in the cavity. The sense control device is disposed in the tube body and electrically connected with the wrench electronic connection portion. The wireless connection and charge module is detachably combined to the cavity. The wireless connection and charge module comprises a shell body, a carry board, a wireless connection unit, a charge unit, and a rechargeable battery. The shell body comprises a first end and a second end. The first end comprises a module electronic connection portion. The shell body is inserted in the cavity, whereby the module electronic connection portion is electrically connected with the wrench electronic connection portion. The second end comprises an insertion groove along the axial direction. The carry board is disposed in the insertion groove and electrically connected with the module electronic connection portion. The wireless connection unit and the charge unit are disposed on the carry board. The rechargeable battery is disposed in the shell body and electrically connected with the module electronic connection portion.

With such configuration, the wireless connection and charge module are detachable combined with the electronic wrench. The wireless connection and charge module is combined with the electronic wrench for providing power supply and wireless signal transmission function. When the mechanical structure of the electronic wrench is damaged and unusable, the wireless connection and charge module is able to be detached from the original electronic wrench and re-installed on another electronic wrench for future usage. Therefore, the service life of the wireless connection and charge module is continued, so that it is unnecessary to discard the whole electronic wrench, thereby lowering the cost for purchasing a new wrench.

In addition, the wireless connection and charge module of the present invention is modularized. Also, the wireless connection and charge module and the sense control device of the electronic wrench are separately manufactured. Therefore, the present invention lowers the limitation of development and design of such components, and improves the flexibility of functional and aesthetic designs of the electronic wrench.

DETAILED DESCRIPTION OF THE INVENTION

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Figure 1:
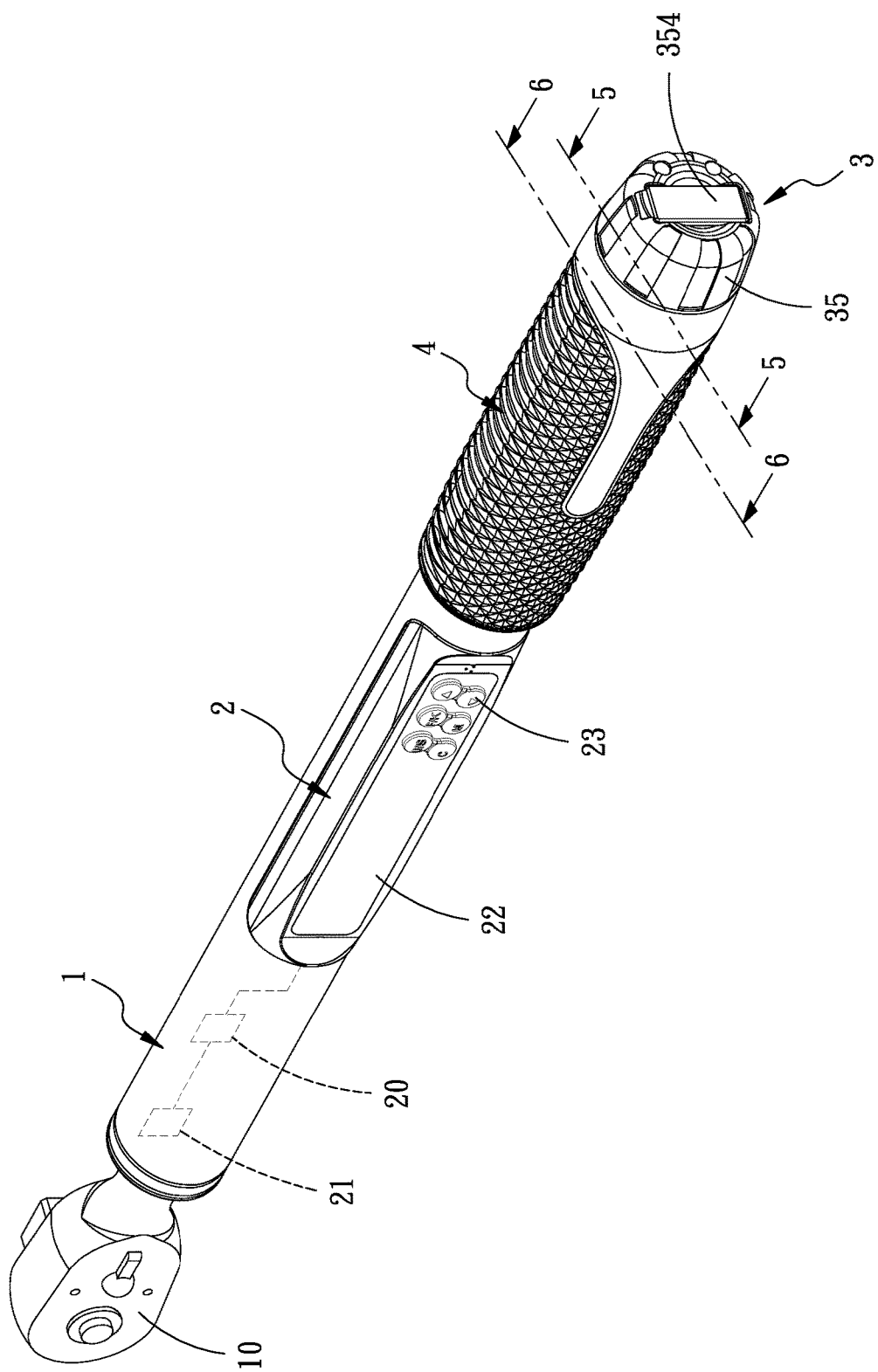
FIG. 1 is a perspective view of the electronic wrench in accordance with an embodiment of the present invention.
Figure 2:
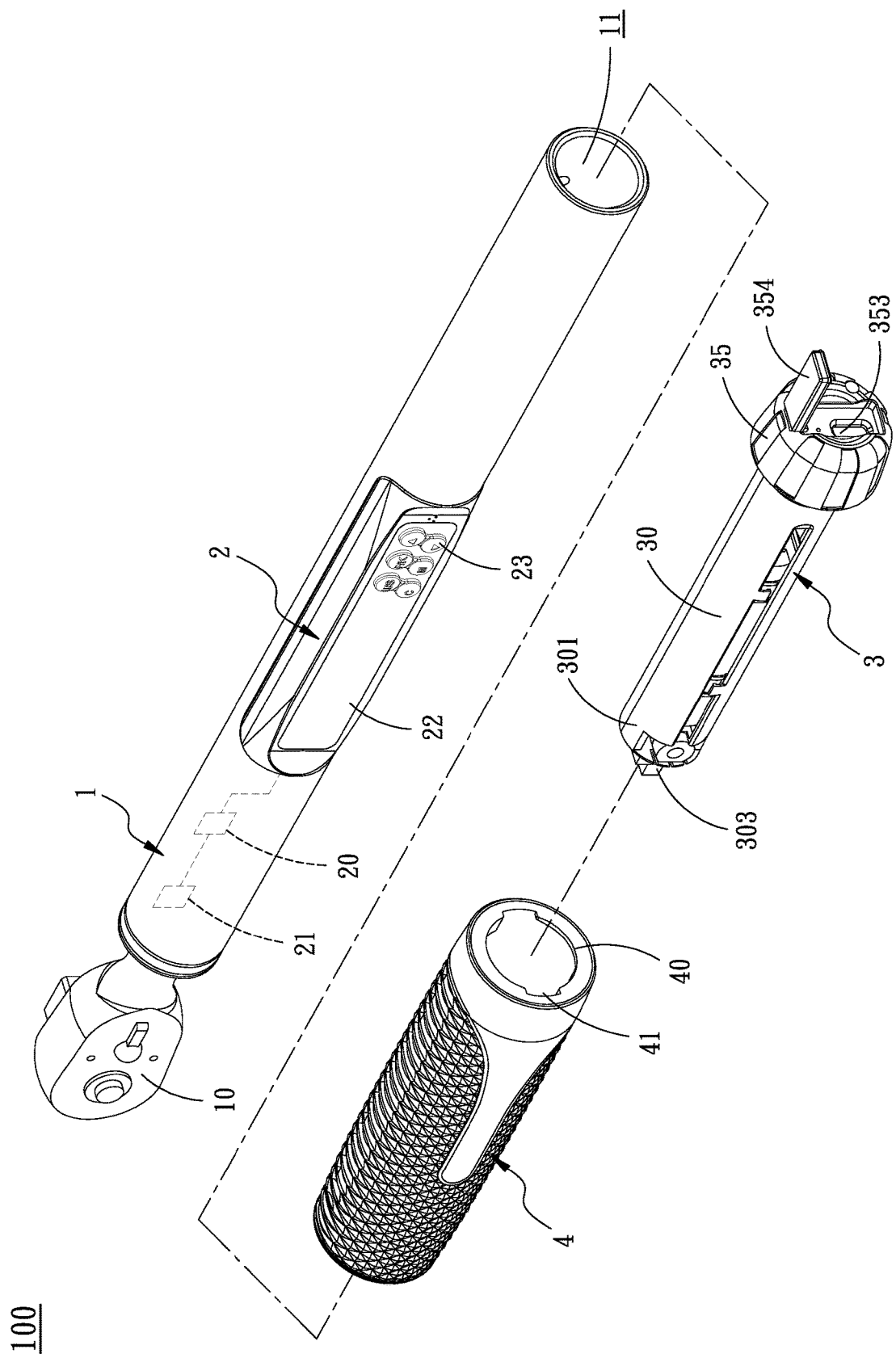
FIG. 2 is an exploded view illustrating the structure of the electronic wrench in accordance with an embodiment of the present invention.
Figure 3:
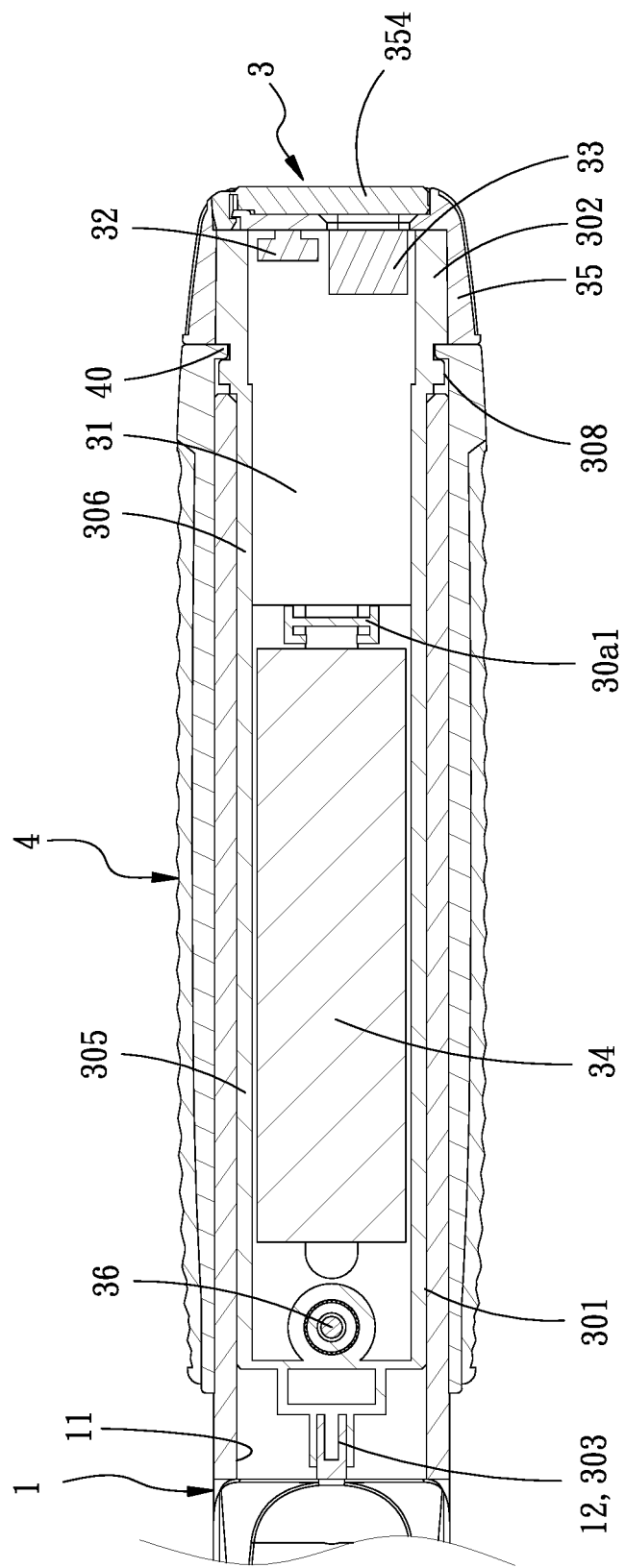
FIG. 3 is a partially enlarged sectional view of the electronic wrench in accordance with an embodiment of the present invention.
Figure 4:
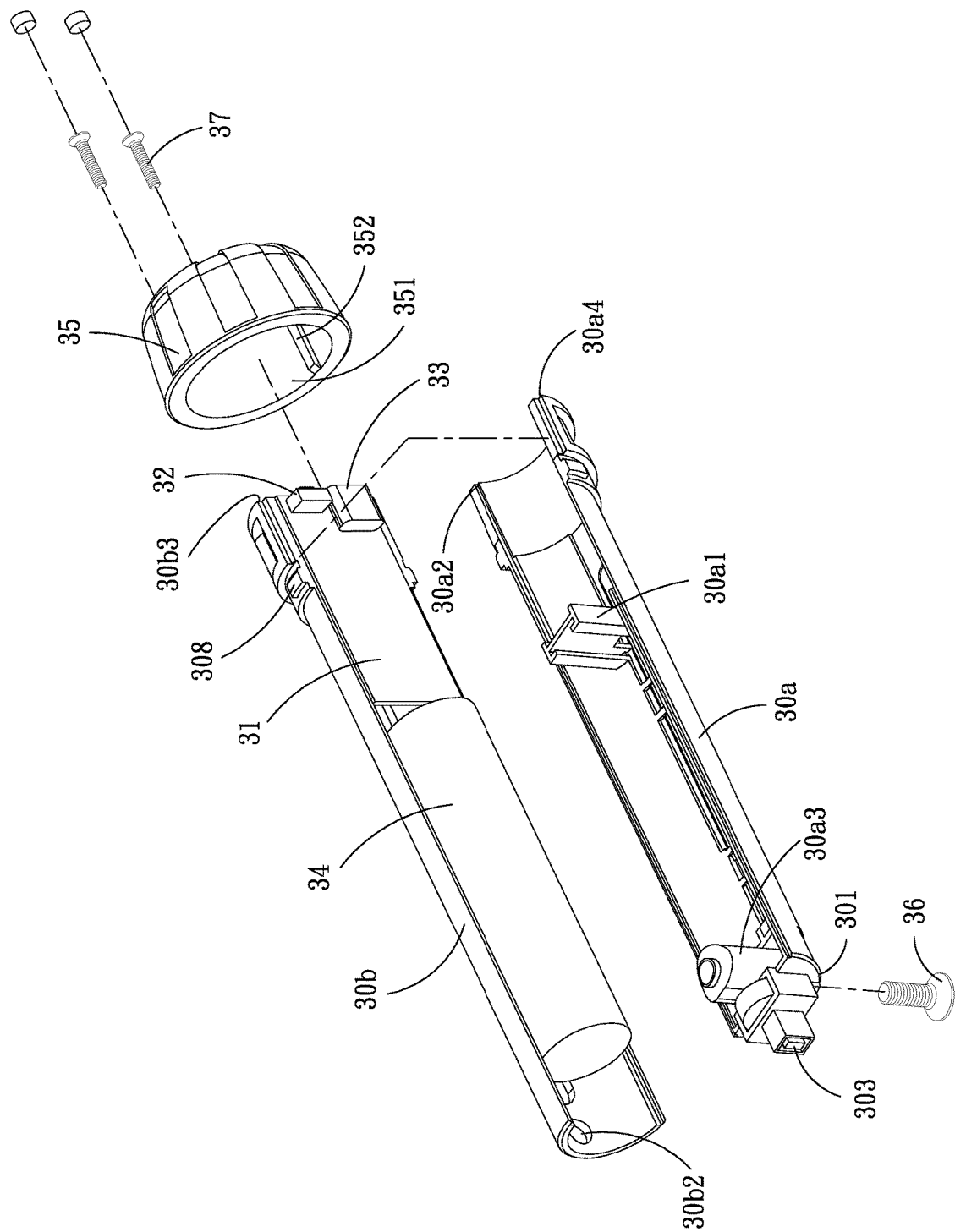
FIG. 4 is an exploded view illustrating the structure of the wireless connection and charge module in accordance with an embodiment of the present invention.
Figure 5:
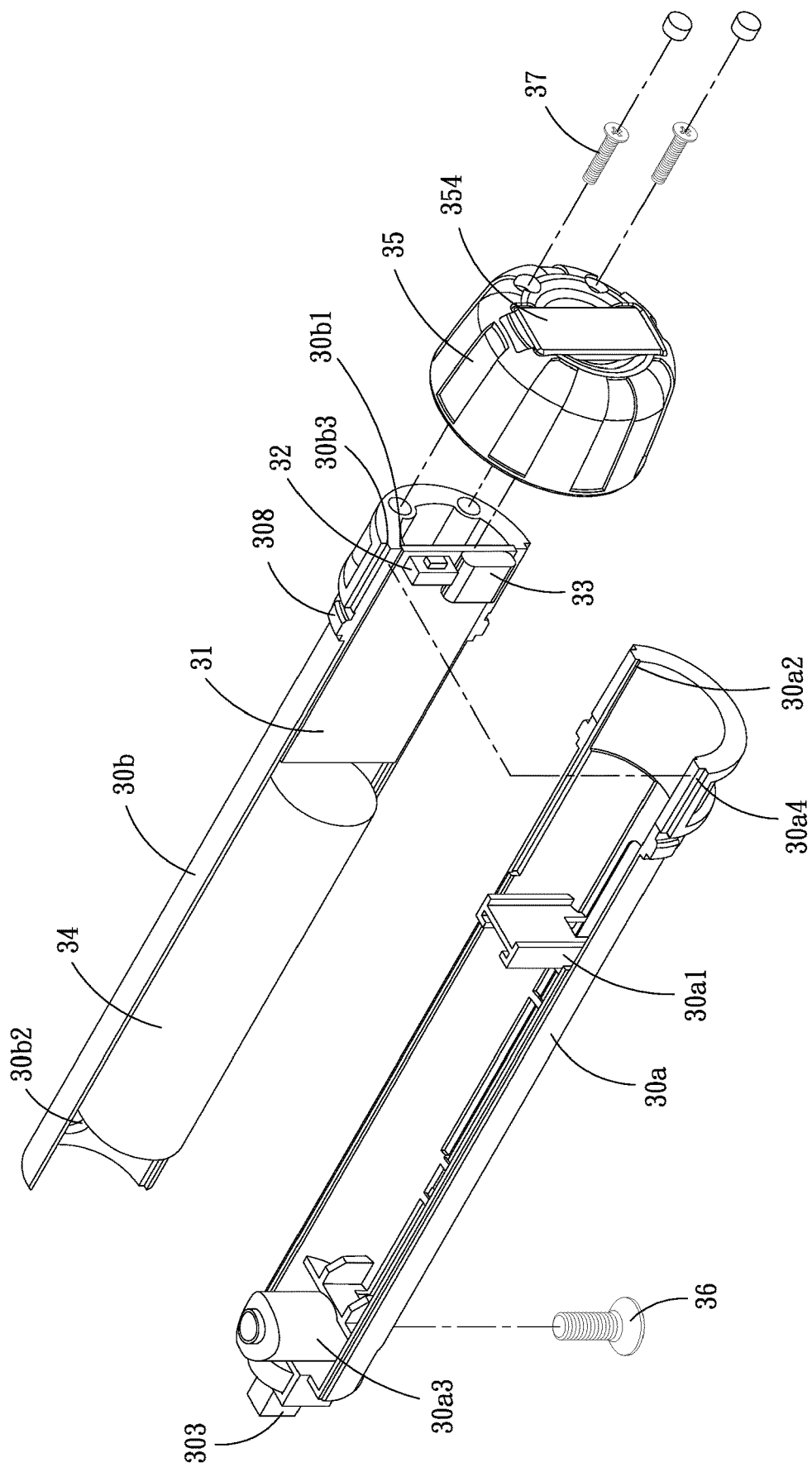
FIG. 5 is an exploded view from another viewpoint illustrating the structure of the wireless connection and charge module in accordance with an embodiment of the present invention.
Figure 6:
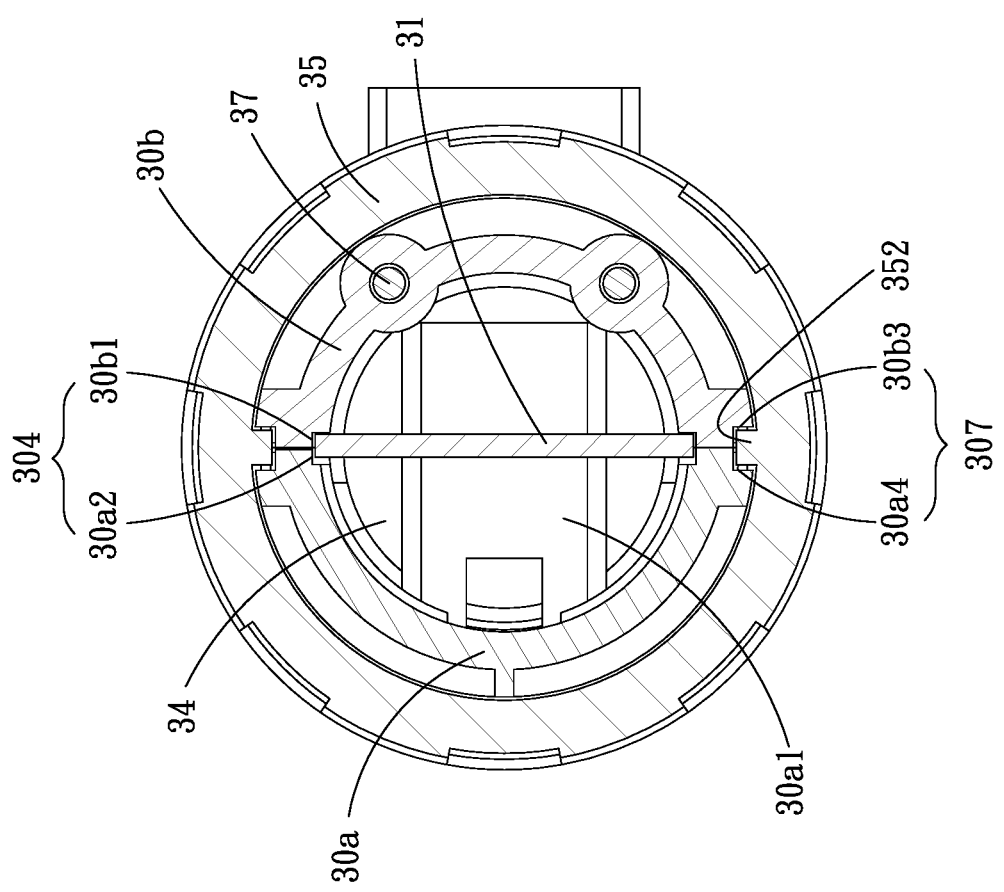
FIG. 6 is a cross-sectional view taken along line 6-6 in FIG. 1 of the present invention.
Figure 7:
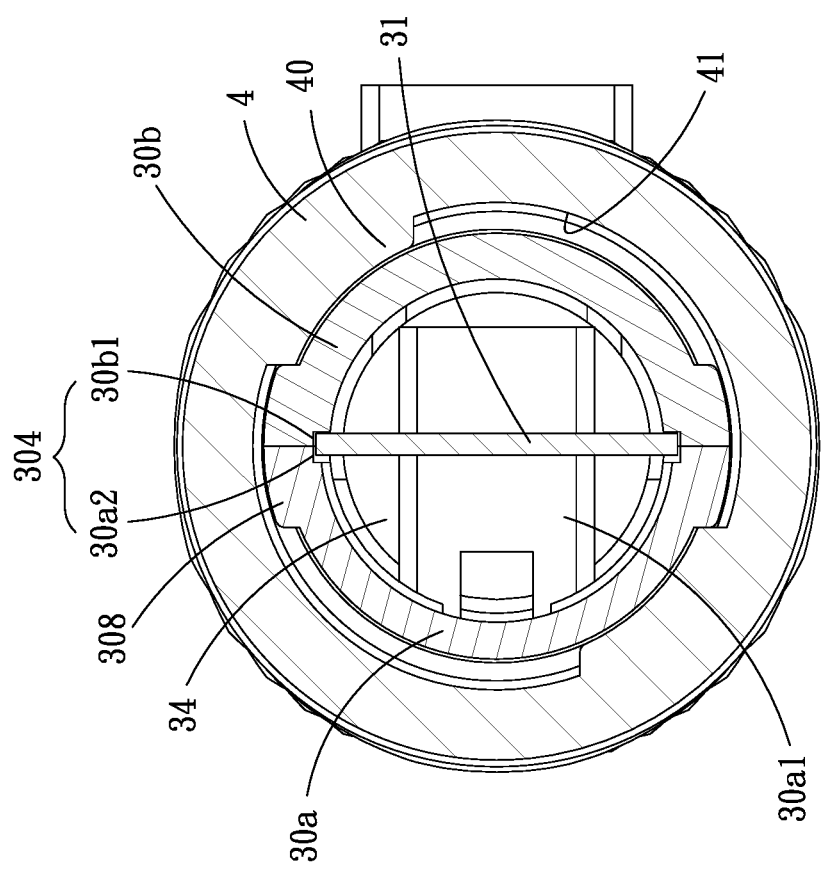
FIG. 7 is a cross-sectional view taken along line 7-7 in FIG. 1 of the present invention.

Referring to FIG. 1 to FIG. 7, the present invention provides an electronic wrench 100, comprising a tube body 1, a sense control device 2, a wireless connection and charge module 3, and a handle cover 4. The wireless connection and charge module 3 is formed in a modularized design, which is detachably combined to the tube body 1, such that when the mechanical structure of the electronic wrench 100 is damaged, the wireless connection and charge module 3 is allowed to be detached and re-installed on another electronic wrench for continuous usage.

The tube body 1 comprises a drive portion 10 on one end and a cavity 11 on the other end, with a wrench electronic connection portion 12 disposed in the cavity 11. Therein, the drive portion 10 is formed in a, for example but not limited to, ratchet type driver.

The sense control device 2 is disposed in the tube body 1 and electrically connected with the wrench electronic connection portion 12. The sense control device 2 comprises a process portion 20, a sense portion 21, a display portion 22, and an operation portion 23 electrically connected to each other. The sense portion 21 is configured to sense the torque value of the electronic wrench 100 through a, for example, strain gauge. The process portion 20 receives the signal of the sense portion 21 to generate the torque value, which is displayed by the display portion 22. The operation portion 23 is disposed on one side of the display portion 22 and configured to set the operations of different functions of the sense control device 2.

The wireless connection and charge module 3 comprises a shell body 30, a carry board 31, a wireless connection unit 32, a charge unit 33, a rechargeable battery 34, and a tail cap 35. The wireless connection and charge module 3 is modularized. Also, the wireless connection and charge module 3 and the sense control device 2 are separately manufactured. Therefore, the design and development of the electronic modules of the electronic wrench 100 does not require complicated and huge amounts of molds, so that the manufacturing cost of the present invention is lowered.

The shell body 30 comprises a first end 301 and a second end 302. The first end 301 comprises a module electronic connection portion 303. The first end 301 of the shell body 30 is allowed to be inserted in the cavity 11, whereby the module electronic connection portion 303 is electrically connected with the wrench electronic connection portion 12 of the electronic wrench 100. The second end 302 comprises an insertion groove 304 formed along the axial direction thereof. The module electronic connection portion 303 and the wrench electronic connection portion 12 are connected through a combination of an insertion bore and a probe or other engagement structure capable of realizing the cooperation of signal and power supply transmission. In the embodiment, the shell body 30 comprises a first half shell 30a and a second half shell 30b that are combined together, wherein the first half shell 30a and the second half shell 30b forms the insertion groove 304 therebetween, and the module electronic connection portion 303 is disposed on the first half shell 30a.

The first half shell 30a has a partition 30a1 disposed in a radial direction between two ends thereof, so as to divide the inner space of the shell body 30 into a first area 305 and a second area 306. The rechargeable battery 34 is disposed in the first area 305. Also, the first area 305 further comprises a conductive plate connecting the positive polar and the negative polar of the rechargeable battery 34, such that the rechargeable battery 34 is electrically connected with the module electronic connection portion 303. The carry board 31 is disposed in the insertion groove 304 and positioned in the second area 306. Further, the first half shell 30a comprises two first recess portions 30a2 arranged away from the module electronic connection portion 303. The two first recess portions 30a2 are disposed on the inner side of the first half shell 30a and arranged along the length direction thereof. The first half shell 30a comprises a first fix portion 30a3 arranged in adjacent to the module electronic connection portion 303. The first half shell 30a comprises two first drop portions 30a4 arranged away from the module electronic connection portion 303. The two first drop portions 30a4 are disposed on the outer side of the first half shell 30a and arranged along the length direction thereof. Also, the length of the two first drop portion 30a4 is smaller than the length of the two first recess portions 30a2.

The second half shell 30b comprises two second recess portions 30b1 corresponding to the first recess portions 30a2 arranged away from the module electronic connection portion 303. The two second recess portions 30b1 are disposed on the inner side of the second half shell 30b along the length direction. Therein, after the first half shell 30a and the second half shell 30b are combined, the two first recess portions 30a2 and the two second recess portions 30b1 form the insertion groove 304 for the carry board 31 to be inserted therein. Further, the second half shell 30b comprises a second fix portion 30b2 arranged in adjacent to the module electronic connection portion 303. The first fix portion 30a3 is combined with the second fix portion 30b2, with a fastener 36 passing therethrough for fixing them. The second half shell 30b comprises two second drop portions 30b3 corresponding to the two first drop portions 30a4 arranged away from the module electronic connection portion 303. The two second drop portions 30b3 are disposed on the outer side of the second half shell 30b and arranged along the length direction. Also, the length of the two second drop portions 30b3 is smaller than the length of the two second recess portions 30b1. Each first drop portion 30a4 and each corresponding second drop portion 30b3 form a position groove 307.

The carry board 31 is inserted in the insertion groove 304 and electrically connected with the module electronic connection portion 303.

The wireless connection unit 32 and the charge unit 33 are both disposed on the carry board 31. The wireless connection unit 32 is configured to be communicatively connected with the terminal device through Bluetooth. The terminal device is a, for example, smartphone. In communication, the smartphone is able to display the torque value and a predetermined torque value of the electronic wrench 100, or carry out functions such as value storing, comparing, analyzing, and prompting.

The rechargeable battery 34 is disposed in the shell body and electrically connected with the module electronic connection portion 303 and the carry board 31 for providing power supply to the said electronic components. In the embodiment, the charge unit 33 is a USB connection port.

The tail cap 35 comprises a housing recess 351 on one end to be mounted around the second end 302 of the shell body 30 exposed from the tube body 1. The housing recess 351 comprises two protrusions 352 disposed on the inner wall thereof in an axially symmetric arrangement. The two protrusions 352 are configured to be engaged with the two position grooves 307, so as to prevent the tail cap 35 from rotating with respect to the shell body 30. In the embodiment, the tail cap 35 comprises a charge socket 353 connected with the housing recess 351 corresponding to the charge unit 33. Also, the tail cap 35 comprises a dust cover 354 which optionally covers the charge socket 353. The dust cover 354 is pivotally disposed on the tail cap 35. When the charge socket 353 is not covered by the dust cover 354 and therefore exposed, a USB connection wire is allowed to be used for charging the rechargeable battery 34 with an external power.

In another embodiment of the present invention, a plurality of lock members 37 are included for passing through the tail cap 35 and the second half shell 30b, whereby the tail cap 35 and the shell body 30 are combined.

The handle cover 4 formed by double material injection molded. The handle cover 4 is mounted around the tube body 1 away from the drive portion 10. The second end 302 of the shell body 30 is allowed to rotate between a first position and a second position with respect to the handle cover 4. At the first position, the shell body 30 is able to be axially detached from the tube body 1, facilitating the changing operation of the wireless connection and charge module 3. At the second position, the shell body 30 is prevented from axial detachment from the tube body 1 by the handle cover 4, thereby maintaining the assembled status. In the embodiment, two block portions 308 are disposed on the outer periphery of the second end 302 of the shell body 30. Two block edges 40 and two pass recesses 41 are formed on the inner periphery of the handle cover 4, wherein the two block edges 40 are positioned between the two pass recesses 41. At the first position, the two block portions 308 are allowed to freely pass through the two pass recesses 41. At the second position, the two block edges 40 block the two block portions 308 in the axial direction of the tube body 1. Therein, each block portion 308 is formed of the stop block on the outer periphery of the first half shell 30a and the second half shell 30b, respectively. Therefore, the present invention applies the handle cover 4 not only for anti-slip gripping, but also for positioning the wireless connection and charge module 3 in the tube body 1.

With such configuration, the wireless connection and charge module 3 of the present invention is formed in a modularized design, so as to be detachably combined to the electronic wrench 100 and electrically thereto for providing power supply and wireless signal transmission functions. With such design, the manufacturing of the present invention does not require complicated and a huge amount of molds, lowering the manufacturing cost.

Furthermore, when the mechanic structure of the electronic wrench 100 is damaged and unusable, the wireless connection and charge module 3 is allowed to be detached from the original electronic wrench 100 to be re-installed on another electronic wrench for future usage. Thus, the service life of the wireless connection and charge module is continued, so that it is unnecessary to discard the whole electronic wrench 100, thereby lowering the cost for purchasing a new wrench.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A wireless connection and charge module which is detachably combined to an electronic wrench, the wireless connection and charge module comprising:

a shell body having a first end and a second end, the first end being inserted in one end of the electronic wrench, the second end comprising an insertion groove arranged in an axial direction, the first end comprising a module electronic connection portion configured to be electrically connected with the electronic wrench;

a carry board disposed in the insertion groove and electrically connected with the module electronic connection portion;

a wireless connection unit disposed on the carry board;

a charge unit disposed on the carry board; and a rechargeable battery disposed in the shell body and electrically connected with the module electronic connection portion and the carry board.

2. The wireless connection and charge module of claim 1, wherein the shell body comprises a first half shell and a second half shell that are combined with each other; the first half shell comprises a partition disposed in a radial direction, and the partition divides an inner space of the shell body into a first area and a second area; the rechargeable battery is disposed in the first area, and the carry board is disposed in the second area.

3. The wireless connection and charge module of claim 2, wherein the first half shell comprises two first recess portions arranged away from the module electronic connection portion; the two first recess portions are disposed on an inner side of the first half shell and arranged along a length direction thereof; the second half shell comprises two second recess portions corresponding to the two first recess portions; the two first recess portions and the two second recess portions form the insertion groove together.

4. The wireless connection and charge module of claim 3, wherein the first half shell and the second half shell comprise a first fix portion and a second fix portion arranged in adjacent to the module electronic connection portion, respectively; the first fix portion and the second fix portion are combined, with a fastener passing therethrough for fixing the first fix portion and the second fix portion.

5. The wireless connection and charge module of claim 3, further comprising a tail cap; the tail cap having a housing recess on one end thereof to be mounted around the second end; the housing recess comprising two protrusions disposed on an inner wall thereof in an axially symmetric arrangement; the first half shell comprising two first drop portions arranged away from the module electronic connection portion; the two first drop portions being disposed on an outer side of the first half shell and arranged along the length direction thereof; the second half shell comprising two second drop portions corresponding to the two first drop portions; each first drop portion and each corresponding second drop portion forming a position groove for being engaged with a protrusion of the housing recess, thereby preventing the tail cap from rotating with respect to the shell body.

6. The wireless connection and charge module of claim 5, wherein the tail cap comprises a charge socket connected with the housing recess corresponding to the charge unit; the tail cap comprises a dust cover which optionally covers the charge socket.

7. The wireless connection and charge module of claim 5, further comprising a plurality of lock members passing through the tail cap and the second half shell, respectively.

8. An electronic wrench, comprising:

a tube body having a drive portion on one end and a cavity on the other end, with a wrench electronic connection portion disposed in the cavity;

a sense control device disposed in the tube body and electrically connected with the wrench electronic connection portion;

a wireless connection and chargeable module detachably combined to the cavity, the wireless connection and chargeable module comprising a shell body, a carry board, a wireless connection unit, a charge unit, and a rechargeable battery;

the shell body having a first end and a second end, the first end comprising a module electronic connection portion, the shell body being inserted in the cavity, such that the module electronic connection portion is electrically connected with the wrench electronic connection portion, the second end comprising an insertion groove arranged in an axial direction;

the carry board disposed in the insertion groove and electrically connected with the module electronic connection portion;

the wireless connection unit and the charge unit being disposed on the carry board; and the rechargeable battery being disposed in the shell body and electrically connected with the module electronic connection portion and the carry board.

9. The electronic wrench of claim 8, wherein the shell body comprises a first half shell and a second half shell that are combined with each other; the first half shell and the second half shell form the insertion groove therebetween; a tail cap is included and mounted around the second end of the shell body; the tail is prevented from respective rotation.

10. The electronic wrench of claim 9, further comprising a handle cover mounted around the tube body away from the drive portion; the second end of the shell body being configured to rotate between a first position and a second position with respect to the handle cover; at the first position, the shell body being able to be axially detached from the tube body; at the second position, the shell body being prevented from axial detachment from the tube body by the handle cover; two block portions being disposed on an outer periphery of the second end of the shell body exposed from the tube body; two block edges and two pass recesses being formed on an inner periphery of the handle cover; at the first position, the two block portions being allowed to freely pass through the two pass recesses; at the second position, the two block edges blocking the two block portions in an axial direction of the tube body.

* * * * *